Oct. 15, 1963

W. D. MULLINS, JR., ET AL 3,106,847

GYROSCOPIC APPARATUS

Filed Dec. 12, 1960

INVENTORS
WILLIAM D. MULLINS JR.
WILLIAM M. SCARBOROUGH

BY Allan Rothenberg

ATTORNEY

Oct. 15, 1963    W. D. MULLINS, JR., ET AL    3,106,847
GYROSCOPIC APPARATUS
Filed Dec. 12, 1960    3 Sheets-Sheet 2

*INVENTORS*
WILLIAM D. MULLINS JR.
WILLIAM M. SCARBOROUGH
BY Allan Rothenberg

ATTORNEY

United States Patent Office 3,106,847
Patented Oct. 15, 1963

3,106,847
GYROSCOPIC APPARATUS
William D. Mullins, Jr., Downey, and William M. Scarborough, Whittier, Calif., assignors to North American Aviation, Inc.
Filed Dec. 12, 1960, Ser. No. 75,442
18 Claims. (Cl. 73—505)

This invention relates to stable reference apparatus and more particularly concerns gyroscopic devices employing an oscillatory element instead of the commonly used rotary element.

Most man-made stabilizing devices in use today embody a rotating mass which has the property of maintaining a space fixed plane of rotation. Limitations on the performance of instruments of this type include those which arise from severe difficulties encountered in fabrication of bearings for the instrument. In the manufacture of instruments of great precision there yet remain unsolved many problems relating to the precision rotor spin bearings and the low coercion bearings required for the output axis of the instrument. Further, most precision rotating mass gyros are unfavorably affected by temperature, linear accelerations and vibration of the support.

Recognizing the many disadvantages of the rotating mass gyro, attempts have been made to construct vibrating string gyros. The operation of such devices are based on the well established principle that a body oscillating in a plane will maintain its plane of vibration fixed in inertial space unless it is subjected to oscillatory forces normal to and in time phase with the velocity vector of the vibrating body. However, no vibrating string gyros or instruments have even approached the performance available from conventional rotating instruments. Such oscillating body instruments are subject to undesired rotation of the plane of vibration due to the coercive effects associated with its drive. They provide no means for precision controllable precession of the plane of vibration. Additionally, such instruments are adversely affected by the serious rotation of the plane of vibration resulting from a synchronous or near synchronous transverse vibration of the string support points.

Accordingly, it is an object of this invention to provide a high performance gyro or space reference which avoids the precision rotor spin bearing and low coercion output axis bearing problems, which is less susceptible to temperature, linear acceleration, and vibration effects than the conventional spinning rotor gyro and further minimizes certain critical performance limiting factors inherent in previously suggested vibrating string instruments.

In carrying out the principles of this invention in accordance with a preferred embodiment thereof, there is provided a string secured at two points thereof to a support which comprises a pair of mutually spaced and rigidly interconnected resonant vibratory diaphragms. A closed loop longitudinal end drive is provided by sensing deflection of one of the diaphragms and imparting a vibratory force to one of the diaphragms in response to the sensing means. To provide self-starting and a desired constant tension condition, means is provided to cause the starting end motion amplitude to be substantially greater than the normal operating amplitude and then to cause the amplitude to stabilize at the normal. The instrument embodies apparatus for effecting controllable rotation of the plane of vibration of the string with respect to inertial space in the form of a pair of mutually orthogonal magnetic fields of which one is fixed and the other variable, whereby precession will be achieved at a rate proportional to the product of the two fields.

For the purpose of minimizing the adverse effects of transverse string support vibration at or near string frequency, there is provided a number of vibration absorbing resonant elements tuned to string frequency mounted on the string support together with a resilient mounting in all directions normal to the string axis of the string support to a base upon which the instrument is to be carried.

The instrument constructed according to the principles of this invention thus provides a precision oscillatory stable reference.

An object of this invention is to increase the stability of the plane of vibration of an oscillatory stable reference device.

Another object of the invention is to provide a vibrating string gyro having means for precisely and controllably precessing its vibratory plane.

A further object of the invention is to minimize effects of transverse vibration of the string support points.

Another object of the invention is to provide an improved longitudinal drive for a vibrating string gyro.

Still another object of the invention is to provide a longitudinal drive for an oscillatory instrument which is self-starting.

A further object of the invention is to provide a controllable combination of angular rate and angular displacement information for use in a flight control system.

These and other objects of the invention will become apparent from the following description taken in connection with the accompanying drawings in which:

FIG. 1 comprises a functional diagram of an exemplary embodiment of the invention;

FIG. 2 comprises a sectional view of an embodiment of the invention;

Figure 5:
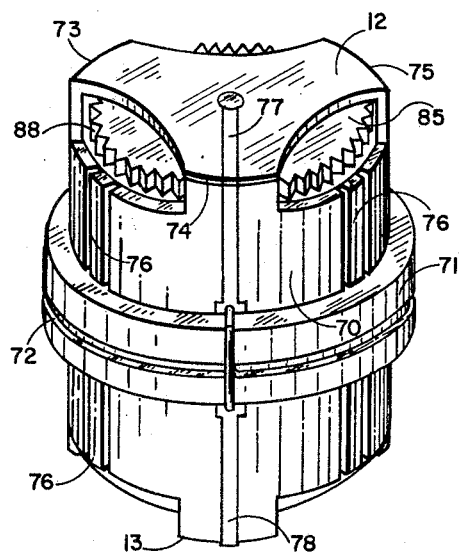
Figure 3:
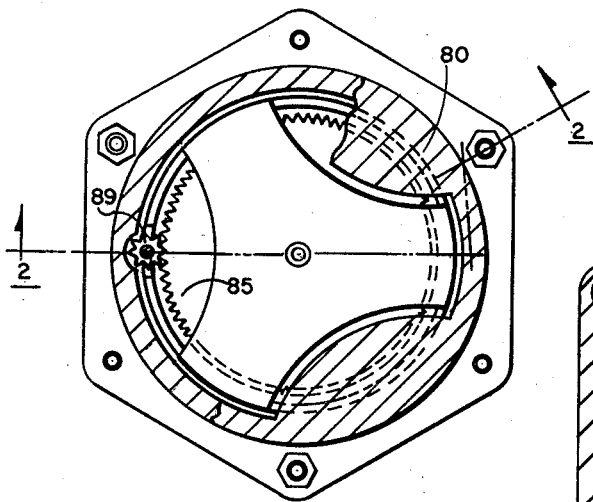
FIG. 3 is a section taken on lines 4—4 of FIG. 2.
Figure 2:
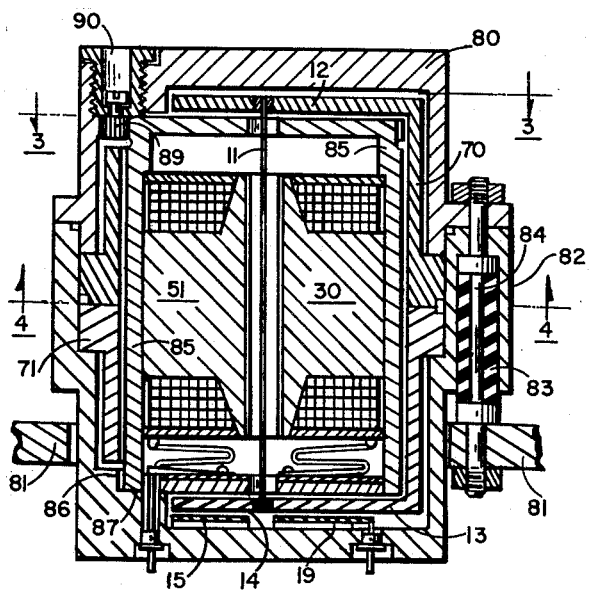
Figure 6:
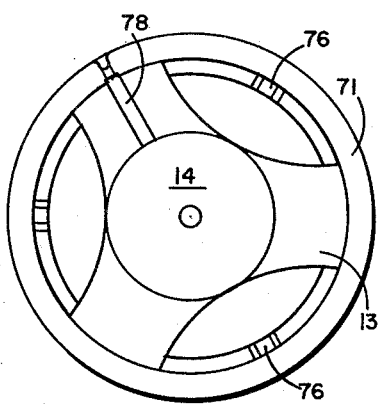
Figure 8:
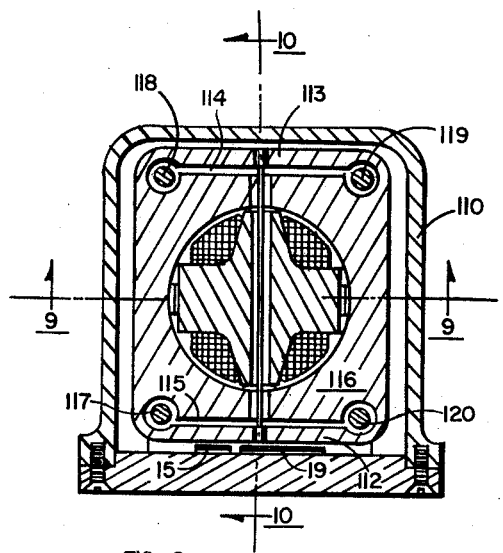
Figure 9:
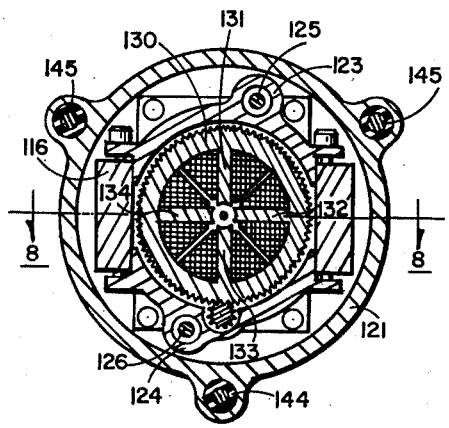
Figure 10:
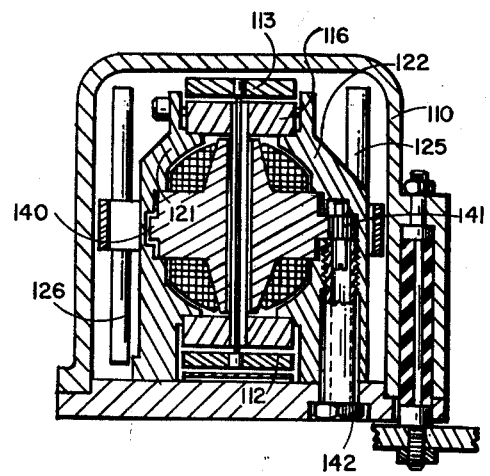
Figure 7:
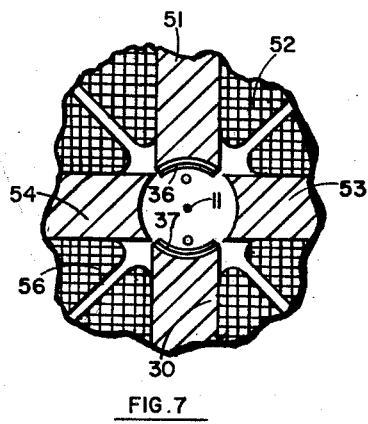

FIG. 5 comprises a pictorial representation of the string support assembly of the embodiment of FIG. 2;

FIG. 6 is a bottom view of the string support assembly;

FIG. 7 is an enlarged view of the string and the adjoining magnetic and capacitative structures; and FIGS. 8, 9 and 10 comprise sectional views of a second embodiment of the invention.

In the drawings like reference characters refer to like parts.

Figure 1:
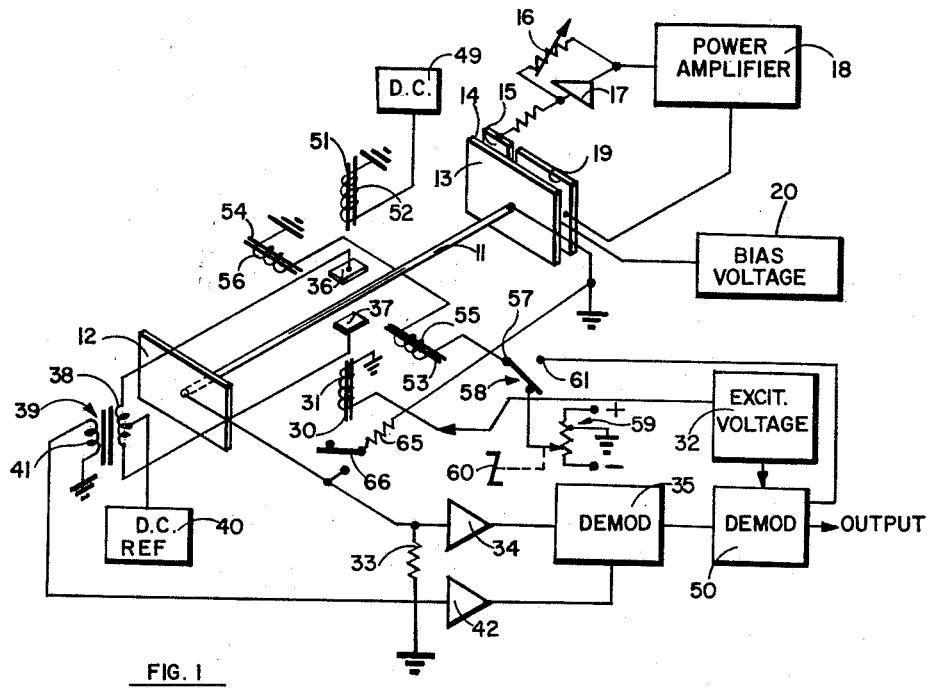

With reference to FIG. 1, which illustrates the functional interrelation of the electrical, mechanical and magnetic aspects of a preferred embodiment of the invention, the disclosed vibrating string gyro comprises a fine gold-plated quartz fiber 11 which is stretched to the limit of practicable tension and secured at two points thereof to a pair of vibratory end bars or diaphragms 12 and 13 which are fixedly secured to each other in the illustrated mutually spaced relationship by means to be described more particularly hereinafter. The string or fiber 11 is preferably of circular cross-section and may be on the order of one to three mils in diameter, having a length of one to two inches. The diaphragms 12 and 13, both of which are formed integrally with a quartz supporting body to be described below, may be of a thickness on the order of 60 mils and are caused to vibrate in opposition so as to move the ends of the string precisely axially, that is, both diaphragms move inwardly together and outwardly together.

The vibrating system thus formed is dynamically balanced so that the resulting Q is high. A high degree of symmetry of the vibrating diaphragms 12, 13 is employed to insure that the motion of the string end points is solely axial. For purposes of maintaining stability of the references plane of a device of this nature, it is desirable that the variation in tension of the string during its vibration is held to a minimum. For example, despite all precautions, some transverse vibration of the support will be imparted to the string support points in such a way as to produce an elliptical vibratory string path. With such an elliptical path a variation in tension of the string due to nonlinearity will give rise to undesired precession, that is, rotation of the plane of vibration. By proper choice of initial tension and the dimensions determining frequency, and by controlling the amplitude of the end motion, the tension variation can be greatly reduced. The amplitude of the end motion is governed by the operation of the longitudinal driving system which will be described below, together with the dimensions of the vibratory diaphragms. The thickness and distance between supporting points of such diaphragms will govern the resonant frequency thereof at which they are driven. The frequency of the resonant drive is twice that of the string. The string mass per unit length together with the tension is appropriately adjusted for the desired amplitude length ratio. Such a ratio is the ratio of the amplitude of transverse motion of the string to the length of string between support points. By means of a slight trimming of the driving oscillator amplitude, the minimum tension variation condition will be achieved with the amplitude length ratio very close to the desired value.

The resonant system comprising the quartz string vibrating bars or diaphragms 12 and 13, together with the body which forms the support therefor, may be sealed in a case evacuated to a degree that the Q of the resonant bars or diaphragms is exceedingly high, on the order of 100,000, and small driving forces are required to maintain oscillation. With the small driving force required, vibration can be imparted to the resonant system by applying an A.-C. voltage across the capacitor gap to provide an electrostatic drive.

The electrostatic drive comprises a closed loop oscillator including an electrode 14 plated on or otherwise secured to the outer surface of vibratory diaphragm 13 and a capacitive pickoff plate 15 secured to a case in which the instrument is to be mounted. Pickoff device 14, 15 provides a signal indicating amplitude and phase of the driving motion which is amplified by amplifier 17, the gain of which is controlled by a thermistor 16 in its feedback circuit. The signal is then fed to a power amplifier 18. The output of the power amplifier 18 is fed to an electrostatic drive comprising the electrode 14 plated on the diaphragm 13 and a second plated electrode 19 fixed to the instrument case. A D.-C. bias voltage from a source 20 is applied to electrode 14 in order to excite the pickoff and forcing sections, thereby greatly enhancing the efficiency of the A.-C. voltage in driving the resonator. Thus it will be seen that there is provided a feedback oscillator including the vibratory diaphragm 13 as a frequency controlling element thereof which applied a driving voltage at twice the string frequency to the diaphragm 13 across the gap between electrodes 14 and 19.

The thermistor 16, having a resistance which decreases with temperature, will operate normally to limit the signal flowing in the driving oscillator circuit, and thus tend to maintain a constant amplitude of vibration. This thermistor has a second significant function which arises by reason of the desire for operating the string in the desired constant tension condition. For operation in such a constant tension condition difficulties are normally encountered in starting vibration when an end drive is employed. For this reason the thermistor 16 is utilized to cause the starting end motion amplitude to be substantially greater, on the order of approximately 75 percent greater, than the normal operating amplitude. The increased starting amplitude is caused by the thermal characteristics of the thermistor 16 which when cold has a relatively high resistance, thereby allowing a larger signal to flow through the driving oscillator circuit. Shortly after the vibration is started and the thermistor heats up, its resistance decreases thereby decreasing the gain of amplifier 17 and the signal flow in the driving oscillator circuit is decreased to a point where it maintains a steady level.

The plane of vibration of the string 11 tends to remain fixed in space whereby if the support or body which carries the instrument is rotated about the axis of the string 11, an indication of the angular relation between the plane of vibration of the string and the carrying body will provide the desired angular information output. For this purpose there is provided a magnetic structure comprising a core 30 fixed to the string support, having a coil 31 wound thereon and excited from a source of A.-C. voltage 32 which has a frequency substantially different than the resonant string frequency and is a non-integral multiple thereof. In the described embodiment the sensing field provided by the magnetic structure 30, 31 is caused to be of alternating polarity rather than unipolar in order to enable operation of the torquing or precession controlling magnetic structure which will be described hereinafter. The alternating magnetic field direction defines the reference plane of vibration of the string. As long as the string is vibrating in a plane parallel to the field provided by the magnet 30, 31, no current is induced in the electrically conductive gold-plated string 11. However, upon rotation of the string support about the string axis, the magnet structure 30, 31 is rotated relative to the vibratory plane and the string velocity now has a component normal to the magnetic field to thereby produce a current in the string. This current flows between the grounded end of the string and a grounded resistance 33 coupled across the string. The signal across this external resistance is fed through an amplifier 34 and thence to a first demodulator 35 which is phase referenced by a signal having the frequency of the string vibration.

The phase reference for demodulator 35 is provided by a pair of capacitive pickoff plates 36, 37 mounted adjacent the string so that displacement of the string will be toward and away from these plates. Thus opposite sense signals are provided in the two plates 36 and 37 which are connected to opposite ends of a primary winding 38 of a transformer 39. The primary winding 38 is center tapped for the necessary D.-C. excitation voltage from source 40. The transformer 39 has a secondary 41 which thus feeds the string pickoff signal via an amplifier 42 to the demodulator 35. The phase reference signal from the transformer 39 is, of course, at string frequency since the capacitance between the plates 36, 37 and the string 11 varies exactly at the string frequency.

If a D.-C. sensing field had been utilized for the magnet structure 30, 31, the output of demodulator 35 would yield a signal having an amplitude proportional to the sine of the angle of rotation and a polarity according to the sense of such angle. However, the sense of the output signal also depends upon the sense of the magnetic field. Since the latter is of alternating polarity, it is necessary to further demodulate, employing a second demodulator 50 which receives the output of demodulator 35 and which is phased referenced from the exciting voltage source 32 at the frequency of the sensing magnetic field. Thus, the output of the second demodulator 50 will provide the desired output signal which may be fed, as is well known, to drive an appropriate servo channel of a stabilized platform upon which the instrument may be mounted so as to maintain close coincidence of vibration and reference planes. In other words, this instrument, just as a conventional rotating mass gyro, will provide an angular output signal which is proportional to the angular deviation of a stable platform from the reference defined by the gyro and which can be utilized to operate a gimbal servo motor on the platform so as to rotate the platform in a direction such as to null the angular deviation.

In order to reject the signal arising from any lateral third mode string motion, the length of the pole structure 30 of the sensing magnet in the direction of the string is preferably on the order of two-thirds the string length. Thus, approximately equal and opposite third mode components are induced over this length and the third mode output voltage is reduced. The small current which necessarily flows when this voltage is applied to the amplifier 34 will not cause drift since it is not in phase with the string velocity.

Apparatus is provided in the instrument of FIG. 1 for effecting precision torquing of the instrument, that is, to provide a controllable precession of the plane of the vibration of the string. The torquing apparatus comprises a second magnetic structure including a core 51 having a coil 52 wound thereon and excited from a source 49 of constant D.-C. signal. The magnetic field of structure 51, 52 is preferably directly aligned with the magnetic field of the sensing structure 30, 31. Mounted normal to the magnetic field of structures 30, 31 and 51, 52 are a pair of magnetic cores 53, 54 having a pair of series wound coils 55, 56 thereon. One end of coil 56 is grounded. The other end of coils 55, 56 is connected to a terminal 57 of a switch 58 which, in the position illustrated, couples to the coils 55, 56 a variable signal schematically depicted as derived from a potentiometer 59 under the control of a knob 60. While the D.-C. torquing field of the coil 52 is provided by means of a separate magnetic structure, it will be appreciated that the coils 31 and 52 may be series wound with the D.-C. component being applied by providing a D.-C. component in the exciting A.-C. sensing voltage.

The controllable magnetic field structure 53, 54, 55, 56 provides a magnetic field normal to the normal plane of vibration of the string and thus comprises apparatus for inducing a current in the string which is proportional to the magnitude of this D.-C. torquing field. As the string vibrates it cuts across the D.-C. variable torquing field to induce a current therein which flows through an external resistive load such as the load resistor 33. Now, as the string with the controllable current moves up and down in the D.-C. reference field provided by magnetic structure 51, 52, a transverse force is exerted on the string by the fixed D.-C. reference field. This force is in phase with the string velocity, that is, as the string moves upwardly, a force is exerted on the string toward the left, while as the string moves downwardly the force exerted by the interaction of the fixed D.-C. field and the current flowing therein would be exerted to the right (when viewing the string from a given end). Thus, the plane of vibration of the string will tend to precess at a rate proportional to the product of the current induced therein by the controllable magnetic field and the magnitude of the fixed magnetic field. Therefore, the precession rate is proportional to the variable signal which is supplied to the torquing coils by means of the switch 58. Upon reversal of the sense of variable D.-C. torquing field the direction of precession will reverse.

The presence of the fixed D.-C. field provided by magnet structure 51, 52 will result in precessing forces which tend to align the plane of vibration with this field. That is, this fixed D.-C. field normally tends to cage the instrument. However, the caging time constant, the time required for a return through 67 percent of the angular displacement, will be approximately 100 seconds for a torquing range of 75 degrees per hour and will be as great as 500 seconds for a range of 15 degrees per hour. Further, any string frequency voltage induced by the action of the fixed D.-C. field provided by coil 52 is at string frequency and thus rejected by the output channel comprising the several demodulators.

With the provision of the described torquing arrangement the instrument may be conveniently caged by feeding the output signal from demodulator 50 to a second terminal 61 of the switch 58. Upon operation of the switch 58, the pickoff signal which indicates the angular deviation between the reference plane and the plane of the string support may be fed as a torquing signal to cause precession of the plane of vibration in a sense to minimize deviation between the plane of vibration of the string and the reference plane provided by the magnetic structure 51, 52. As previously mentioned, the latter is aligned with the reference plane provided by magnetic sensing structure 30, 31.

As described in a co-pending application of Campbell et al. for Gyro Compass, Serial No. 740,329, filed June 6, 1958, a gyroscope may be employed to indicate direction on the face of the earth by sensing the rotation vector of the earth. The instrument depicted in FIG. 1 can be simplified for such an application by eliminating the torquer and all the structure therefor and providing rapid caging in the form of a relatively low resistance 65 connected across the string through a switch 66. In such an arrangement the sensing field provided by magnet structure 30, 31 may be D.-C. since the torquer has been eliminated. Rapid caging is provided by closing the switch 66 to provide the relatively low resistance 65 across the string whereby an increased current flow is induced by the component of string motion normal to the sensing field. This increased current flow interacts with the D.-C. sensing field to bring about a rapid caging of the instrument. Upon caging of the instrument switch 66 is opened to provide the relatively high resistance load 33 across the string whereby the caging time constant is greatly increased and the instrument measures displacement.

In a displacement measuring instrument, with the string axis positioned near east-west alignment for gyro-compassing, the plane of vibration will rotate to an angle with respect to the reference plane of the gyro whereby the demodulated pickoff signal will be directly related (in accordance with the cosine of latitude) to the departure of the string axis from east-west. A sensitive null indicator coupled with the pickoff signal will indicate when the instrument and the string axis have been exactly aligned with east-west.

It will be seen that, with the use of a D.-C. sensing field or a D.-C. fixed torquing field provided by structure 51, 52, the instrument will always be subjected to caging forces. These caging forces, as previously described, will be of a magnitude depending upon the magnitude of the current flowing in the string. Thus, with a relatively high resistance across the string the instrument has a long time constant and is, in effect, a displacement measuring instrument. With a relatively low resistance coupled across the string, there is a short time constant and the instrument is largely a rate instrument. This feature may be explained by analogy to conventional rotating mass instruments where a rate gyro is provided by employing a torsional spring on the instrument output axis which restrains output axis precession. With such output axis restraint, the ordinary rotating mass gyroscope is a rate instrument providing an angular output axis displacement which indicates the rate of input axis rotation. Without such output axis string restraint, the output axis angular displacement is a measure of input axis angular displacement whereby the instrument is a displacement instrument. However, even in the most precise instruments there is some restraint on the output axis due to imperfections in output axis bearings, lead-in wire torques, and the like. Thus, even a precision "displacement" gyro acts to some extent as a rate instrument.

With the instrument described in FIG. 1 the voltage E across the string may be defined as follows:

$$E = K\theta = K_1\phi + K_2\dot{\phi} \qquad (1)$$

where $\theta$ is the angle between the sensing field and the vibration, $\phi$ is the angle between the sensing field and the original reference plane, and K, $K_1$ and $K_2$ are constants. $\theta$ indicates the output angle, $\phi$ indicates input angle and $\dot{\phi}$ indicates input rate. It will be seen from this equation that the output voltage has a component indicative of input angle and a component indicative of input rate. As described above, the relative magnitudes of these components is controllable by controlling the resistance across the string. Accordingly, for those aircraft flight control sytems which require combinations of displacement and angular rate information, a suitable combination of resistors 33 and 65 may be chosen to provide the desired proportions of rate and displacement information in the pickoff output signal. Alternatively, a single variable resistor may be utilized across the string in the place of the switchable resistors 65 and 33.

In the torqued instrument described above, absolute magnitudes of stray D.-C. components are of relatively little significance. However, a change in magnitude of any such stray D.-C. magnetic field components will produce the same effect as a change in the controllable field. For this reason magnetic shielding is provided in the form of a low reluctance material surrounding the instrument in order to reduce the changes in stray D.-C. field components to which the instrument is subjected.

Illustrated in FIGS. 2, 3, 4, 5, and 6 is an exemplary mechanization of the structure of the vibratory instrument previously described in connection with FIG. 1. The string 11 is secured at its ends by being cemented to apertures in the vibratory plates 12, 13 illustrated in FIGS. 2 and 5, which are formed integrally with a quartz body 70 having a massive stiffening ring 71 which is grooved as at 72 to afford passage of certain electrical leads. The vibratory diaphragms 12 and 13 are cut away in three places and connected with the body 70 of the support at three places indicated at 73, 74 and 75 of FIG. 5. The body of the support is cut short both top and bottom of the vibratory diaphragms and a number of vibratory reeds 76 are formed in the body by a series of slots cut therein extending inwardly to the stiffening rings 71. Electrical connections to the ends of the string are made by plated leads 77, 78 which extend along the outer surface of the vibratory diaphragms and down along the body thereof toward the stiffening ring at which point connecting wires may be secured.

The vibratory support assembly, which is pictured in FIG. 5, is mounted within a low reluctance sealed case 80 (FIG. 2) which has its two parts, the upper and lower parts thereof, secured together and to a fixed mounting plate 81 by means of a number of shock mounts 82, equally spaced circumferentially of the case. Each shock mount includes a sleeve on one portion of the case mounting, a resilient elongated bushing 83 through which extends a shaft 84 of a bolt and nut arrangement which holds together two parts of the case and also holds the assembly to the base element 81. This arrangement of the shock mounts permits a linear motion of the entire instrument assembly as a unit parallel to the base and in a direction normal to the axial extent of the string. The shock mounts, together with the vibration absorbing resonant reeds, operate to minimize the transmission to the string support assembly 70 of vibrations transverse to the string axis which are at or nearly at string frequency. Should vibrations be transmitted through the shock mount, vibratory forces experienced by the support body 70 will be imparted to the vibrating reeds 76 which are so dimensioned in length and thickness as to be resonant at the string frequency. The parasitic vibration of the reeds 76 thus tend to buck out the vibration of the support body 70 itself.

The instrument embodies a magnetic assembly comprising a substantially cylindrical shell 85 which is mounted on vertical and horizontal shoulders 86 and 87 formed in the lower portion of the case 80 (FIG. 2). The shell 85 is a fairly close fit within these substantially annular shoulders but is mounted so as to be capable of rotation therein about the string axis. Those portions of the case providing the shoulders for mounting the magnetic assembly shell are cut away in those places which are required to receive portions of the vibratory diaphragms which are connected to the main support body 70.

The magnetic assembly shell 85 has the upper end thereof provided with gear teeth 88 engaging a gear 89 which is rotatably carried in a clamp screw 90 threadedly engaged in an aperture in the upper portion of case 80. The shaft mounting the gear 89 to the clamp screw 90 is arranged to receive a gear adjusting tool which may be inserted through the clamp screw 90 for the purpose of effecting a rotational adjustment of the magnetic assembly. The lower edge of the clamp screw 90 bears upon the upper edge of the shell 85 when the clamp is turned down so as to lock the shell in place between the screw and the abutment thereof with the horizontal shoulders 87 of the case 80.

Figure 4:
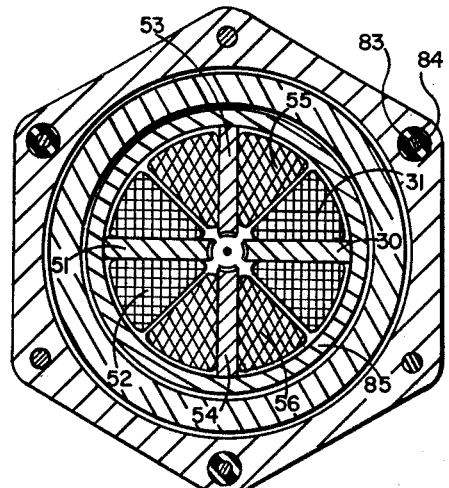
FIG. 4 is a section taken on lines 5—5 of FIG. 2.

As illustrated in FIGS. 2 and 4, the magnetic assembly includes first and second mutually orthogonal pairs of diametrically opposed core members 30, 51, 53, 54 which are fixed to the shell and directed radially inwardly thereof to a point in close proximity to the string 11. The several coils 52, 55, 31, and 56 are wound on the several core members as previously described in connection with FIG. 1. Mounted on the core members 51 and 30, which provide the magnetic field in the reference direction, are the capacitative string frequency reference plates 36, 37 (FIG. 7). These plates may be provided by electrodes placed on the ends of the core structure adjoining the string.

For reasons previously discussed, and as illustrated particularly in connection with FIG. 2, it will be seen that the several core structures extend for substantially two-thirds of the length of the string.

FIG. 6, which is a bottom view of the integral quartz supporting structure, illustrates the movable driving and pickoff plate 14 of the driving oscillator which is a thin film of electrically conductive material suitably deposited and affixed to the exterior surface of the vibratory diaphragm 13. Pickoff plate 15 and driving plate 19 are illustrated in FIG. 2 as being affixed to the inside of the case 80 and suitably electrically insulated therefrom. Of course, the several electrical leads for connection with external circuitry as illustrated in FIG. 1 will be provided although only those connecting the driving plate 19 and certain of the magnetic coils are illustrated in FIG. 2.

Although a suitable string fiber is of small diameter, such as one to three mils, for example, the motion of the string will still be influenced by the bending stiffness predominantly at the string ends. If the cross section of the string at the ends is not precisely circular, errors in this shape together with viscoelastic loss effects will result in substantial drift rates which will periodically vary depending upon the angular orientation of the reference plane. For this reason the magnetic assembly structure which defines the reference plane is provided with adjusting means including teeth 88 and gear 89 for rotating the reference plane about the string axis. Thus, a reference plane may be chosen where the bias torque due to the above considerations is minimum. When such a position is reached, the magnetic structure is clamped in position by means of the clamping screw 90.

If the case should experience a vibration normal to the reference plane which is synchronous or nearly synchronous with the string vibration (a frequency which will normally be on the order of 5 to 10 kilocycles per second), there will be caused a component of string vibration normal to the reference plane. Therefore, the described arrangement includes the six resonant reeds 76 cut into the quartz body 70, together with three vibration isolation mounts 82. The three isolation mounts 82 permit parallel motion of the base relative to the inner assembly or the interior assembly of the instrument in all directions normal to the string axis. These isolation mounts are adjusted so as to be relatively stiff (resonant at a frequency on the order of 50 cycles per second, for example). The peak of resonance of these isolation mounts is limited by the resilient damping sleeve 83 which is subjected to strain when the supporting rods 84 deflectin the presence of vibration of base 81. The resonant reeds 76, formed by slitting the support housing 70 axially down to the stiffening rings 71, form high Q vibration absorbing resonant isolators which are tuned precisely to the string frequency by trimming their outer faces. Since their vibration directions are normal to the string axis and 120 degrees apart, all vibrations normal to the string axis are countered by an appropriate combination of resonator amplitudes.

Despite the structure providing isolation of the string support from transverse vibrations, such vibrations, nevertheless, will still be transmitted to some extent to the string support points. In those applications where angular vibration of the case (about an axis normal to the string axis) in synchronism or near synchronism with string frequency is less severe than the above mentioned transverse linear vibration, an alternative arrangement is available for minimizing the adverse effects of such linear transverse near-synchronous vibration. Such an alternative arrangement comprises the driving of the string in its second mode of vibration rather than its first mode. In second mode a given half of the string is moving in one direction while the other half of the string is moving in the other direction. Thus, a transverse vibration imparted equally to both string ends will tend to move one part of the plane of vibration in one direction and the other part of the plane of vibration in the other direction, thereby effecting substantial cancellation of the adverse effects of near-synchronous transverse vibration of the case.

For effecting a drive of the string in its second vibratory mode, it is necessary simply to appropriately vary the relation between string length and driving frequency. That is, to change from a first mode to a second mode drive for a given driving frequency, the string length would be doubled. Conversely, for a given length string the driving frequency would be doubled to change from first mode oscillation to second mode oscillation. In all cases it is desirable that the amplitude to length ratio, where the length is now taken to be that of a half wave, remain the same.

As illustrated in FIGS. 8, 9 and 10, an alternative embodiment comprises an outer case 110 in which is carried the resonant vibratory string supporting structure. In this arrangement the vibratory string drive members 112 and 113 are formed by slits 114, 115 cut in an integral quartz bar 116. The quartz bar 116 is rigidly clamped between the two halves of a string support body comprising sections 121, 122 which are pulled together to clamp bar 116 by means of bolts 117, 118, 119, 120. Rigidly secured at their midpoints in ears 123, 124 of the string support body 121, 122 are a pair of resonant reeds 125, 126 which act as vibration absorbing members, as previously described in connection with reeds 76 of FIG. 2. Mounted within the string support body 121, 122 is a magnetic assembly of substantially spherical configuration comprising an outer shell 130 and a plurality of inwardly directed magnetic pole members 131, 132, 133, and 134, having coils wound thereon as and for the purpose described in connection with FIG. 2. Magnetic core structures which provide the reference direction of the instrument will have the inner end thereof provided with capacitative pickoff plates as illustrated in the similar arrangement of FIG. 7.

The string is secured at its ends to the resonant members 112 and 113 by being cemented to and within apertures in the members. The vibratory driving oscillator is substantially similar to that described in connection with the embodiment of FIG. 2 and comprises a fixed plate on the external surface of vibratory diaphragm 112, together with a pickoff plate 15 and a driving plate 19 mounted on and insulated from the case 110.

As in the embodiment of FIG. 2, the magnetic structure which defines the reference plane of the apparatus is rotatable about the string axis. An annular flange 140 of the core assembly rides in a mating recess of the string support body 121, 122 to provide a rotatable mounting for the magnetic assembly. On this annular flange there is provided a number of gear teeth meshing with an adjusting gear 141 carried on a shaft which is rotatably mounted in a clamping screw 142 of which several may be provided. A plurality of shock mounts 144, 145, 146 are provided similar to those described in connection with FIG. 2 for mounting the instrument to a base 81. In the configuration of FIGS. 8, 9 and 10, the coils and magnetic circuit are in more extensive thermal contact with the case, so that less temperature rise is possible.

There have been described two different embodiments of a vibratory stable reference apparatus which is capable of greatly increased precision, is less sensitive to external vibration, has provision for precisely controllable precession, has a substantially improved longitudinal end drive, and provides a number of other advantages which derive from the particular configurations described.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Gyroscopic apparatus comprising a support, a vibratory string stretched between two points of the support, means for imparting vibration to the string in a plane having a predetermined relation to the support, signal means for producing a current in the string, magnetic means mounted in close proximity to said string and positioned to produce magnetic fields normal to the longitudinal axis of said string for interacting with said current to provide a precessing force on the string, at least one of said signal means and magnetic means being selectively variable to achieve selective control of the precessing force, and means for providing an output signal indicative of the relation between the support and the plane of vibration of the string.

2. Gyroscopic apparatus comprising a support, an electrically conductive string secured at two points thereof to said support, means including a capacitative pickoff and an electrostatic drive responsive thereto for effecting vibration of said string in a reference plane having a predetermined relation to said support, means including means mounted in proximity to said string for generating a pair of mutually perpendicular magnetic fields normal to the longitudinal axis of said string for effecting selectively variable rotation of the plane of vibration of the string relative to inertial space, and means for providing a signal indicative of the angular relation between said plane of vibration and the support.

3. Gyroscopic apparatus comprising a support, an electrically conductive vibratory string stretched between two points of the support, means for imparting vibration to the string in a plane having a predetermined relation to the support, controllable means for producing a selectively variable magnetic field normal to said string, means for producing a magnetic field normal to said string and to said variable field to provide a precessing force on the string, and means for providing an output signal indicative of the relation between the support and the plane of vibration of the string.

4. Gyroscopic apparatus comprising a support having a pair of mutually spaced resonant diaphragms, a string secured at two points thereof to said diaphragms, means for effecting vibration of the diaphragms to cause oscillation of said string in a reference plane having a predetermined relation to said support, means for effecting controllable rotation of the plane of vibration of the string relative to inertial space, and means for providing a signal indicative of the angular relation between said plane of vibration and the support.

5. Gyroscopic apparatus comprising a support, a vibratory string stretched between two points of the support, means for imparting vibration to the string in a plane having a predetermined relation to the support, controllable signal means for producing a selectively variable current in the string, magnetic means mounted in close proximity to said string and positioned to produce a magnetic field normal to the longitudinal axis of said string for interacting with said variable current to provide a precessing force on the string, and means including a pulsating magnetic field for providing an output signal indicative of the relation between the support and the plane of vibration of the string.

6. Torquing means for a gyro of the type having an electrically conductive string stretched between two points of a support for vibration in a plane, said means comprising a first magnetic structure for providing a first unipolar magnetic field extending substantially normal to the longitudinal axis of said string and in said plane, a second magnetic structure for providing a second unipolar magnetic field extending substantially normal to the longitudinal axis of said string and at an angle of substantially 90 degrees with respect to said first field, and means for effecting selective variation of one of said fields.

7. In a gyro of the type having an electrically conductive string stretched between two points of a support for vibration in a plane, a first magnetic structure for providing a first unipolar magnetic field extending substantially normal to the longitudinal axis of said string and in said plane, a second magnetic structure for providing a second unipolar magnetic field extending substantially normal to the longitudinal axis of said string and at an angle of substantially 90 degrees with respect to said first field, means for effecting selective variation of one of said fields, and sensing means comprising magnetic structure for providing an alternating polarity magnetic field extending substantially normal to said string.

8. In a gyro of the type having an electrically conductive string stretched between two points of a support for vibration in a plane, a first magnetic structure for providing a fixed unipolar magnetic field extending substantially normal to the longitudinal axis of said string and in said plane, a second magnetic structure for providing a selectively variable unipolar magnetic field extending substantially normal to the longitudinal axis of said string and at an angle of substantially 90 degrees with respect to said first field, magnetic structure for providing magnetic field substantially alined with one of said unipolar fields and alternating in polarity at a frequency substantially distinguished from the frequency of vibration of the string, and means for indicating the signal induced in the vibrating string by motion of the string across said last mentioned magnetic field.

9. The structure of claim 8 wherein said indicating means comprises: pickoff means for sensing string frequency, a first demodulator phase referenced from said pickoff means and connected to receive the signal induced in the string, and a second demodulator having an input from said first demodulator and phase referenced from the frequency of said alternating polarity field.

10. Gyroscopic apparatus comprising a case, a support in said case, an electrically conductive string stretched between and secured at two points thereof to said support, drive means for causing said string to vibrate in a plane at a predetermined frequency, a magnetic field structure assembly mounted to said case, said assembly comprising an outer shell mounted to the case for rotation about the axis of the string and first and second mutually orthogonal pairs of diametrically opposed core members fixed to the shell and directed radially inwardly thereof, first and second coils on the respective core members of one of the pairs, said one of the pairs being directed inwardly along an axis lying substantially in said string vibration plane and normal to the longitudinal axis of said string, third and fourth torquing coils on the respective core members of the other pair, a source of alternating potential connected with the first coil, a source of fixed potential connected with the second coil, means for feeding a torquing signal to said torquing coils, and output means coupled with said string for demodulating signals induced in the string in accordance with string frequency and the frequency of said source of alternating potential.

11. Gyroscopic apparatus comprising a case, a support in said case, an electrically conductive string stretched between and secured at two points thereof to said support, drive means for causing said string to vibrate in a plane at a predetermined frequency, a magnetic field structure assembly mounted to said case, said assembly comprising an outer shell mounted to the case for rotation about the axis of the string and first and second mutually orthogonal pairs of diametrically opposed core members fixed to the shell and directed radially inwardly thereof, first and second coils on the core members of one of the pairs, said one of the pairs being directed along an axis lying substantially in said string vibration plane and normal to the longitudinal axis of said string, third and fourth torquing coils on the core members of the other pair, a source of alternating potential connected with the first coil, a source of fixed potential connected with the second coil, a switch alternatively connecting first or second signal terminals to said torquing coils, a variable potential source coupled to one of said terminals, a pair of capacitative pickoff plates mounted on inner ends of the core members of one of said pairs in close proximity to the string, a sensing amplifier having an input coupled to the string, a first demodulator phase referenced from said last mentioned pickoff plates and having an input from said sensing amplifier, a second demodulator phase referenced from said source of alternating potential and having an input from said first demodulator, the output of said second demodulator providing an indication of the relation between the support of the plane of vibration of the string, and an output of said second demodulator being connected with the second signal terminal.

12. In a gyro of the type having an electrically conductive string stretched between two points of a support for vibration in a plane, a first magnetic structure for providing a first unipolar magnetic field extending substantially normal to the longitudinal axis of said string and in said plane, a second magnetic structure for providing a second unipolar magnetic field extending substantially normal to the longitudinal axis of said string and at an angle of substantially 90 degrees with respect to said first field, means for sensing the angular relation of the plane of vibration of the string with respect to the support, and caging means responsive to said sensing means for effecting selective variation of one of said fields.

13. A gyro comprising a support, a string mounted at two points thereof to said support, longitudinal end driving means for vibrating said string with a predetermined amplitude of longitudinal end motion, said driving means including a pair of vibratory diaphragms connected to opposite ends of said string, and electrical control means for initially causing a starting amplitude of longitudinal end motion considerably greater than said predetermined amplitude.

14. Gyroscopic apparatus comprising a pair of mutually spaced and rigidly interconnected resonant vibratory diaphragms; a string stretched between and secured at two points to said diaphragms; and driving means for causing said string to vibrate at half the resonant frequency of said diaphragms, said driving means including means for sensing deflection of one of said diaphragms, and means responsive to said sensing means for imparting a vibratory force to one of said diaphragms at the resonant frequency of said diaphragms.

15. Gyroscopic apparatus comprising a pair of mutually spaced and rigidly interconnected resonant vibratory members; a string stretched between and secured at two points to said members; capacitative means for sensing deflection of one of said members, and electrostatic means responsive to said capacitative means for imparting a vibratory force to one of said members at the resonant frequency of said members and twice the vibration frequency of said string.

16. Gyroscopic apparatus comprising a case, a support in said case including a pair of fixedly interconnected mutually spaced resonant elastic bars, an electrically conductive string stretched between and secured at two points thereof to said bars, a capacitative pickoff including a surface of one of the bars and a conductive plate fixed to the case, an amplifier responsively connected to the pickoff and having a limiting device in circuit therewith, an electrostatic string vibrating drive responsively connected with the amplifier and comprising a surface of one of said bars and a second conductive plate fixed to the case, whereby said string is vibrated at a frequency one-half the natural frequency of the bars.

17. Gyroscopic apparatus comprising a support, a string stretched between two points of the support, means for effecting vibration of the string at a predetermined frequency in a predetermined reference plane, said means for effecting vibration being adapted to vibrate at twice said predetermined frequency, vibratory means fixed to said support for absorbing vibration normal to the axis of the string, said vibratory means being tuned to said predetermined frequency, and means for sensing the angular relation of the plane of vibration of the string with respect to the support.

18. Gyroscopic apparatus comprising a case, a support in said case and including a pair of fixedly interconnected mutually spaced resonant elastic bars, an electrically conductive string stretched between and secured at two points thereof to said bars, a capacitative pickoff including a surface of one of the bars and a conductive plate fixed to the case, an amplifier responsively connected to the pickoff and having a thermistor with thermal lag connected in parallel therewith, an electrostatic string vibrating drive responsively connected with the amplifier comprising a surface of one of said bars and a second conductive plate fixed to the case, whereby said string is vibrated at a frequency directly related to the natural frequency of said bars, a magnetic field structure assembly mounted to said case, said assembly comprising a cylindrical outer shell mounted to the case for rotation about the axis of the string and first and second mutually orthogonal pairs of diametrically opposed core members fixed to the shell and directly radially inwardly thereof, first and second coils on the core members of one of the pairs, third and fourth series wound torquing coils on the core members of the other pair, a source of alternating potential connected with the first coil, a source of fixed potential connected with the second coil, a switch alternatively connecting first or second signal terminals to said torquing coils, a variable potential source coupled to one of said terminals, a pair of capacitive pickoff plates mounted on inner ends of the core members of one of said pairs in close proximity to the string, a sensing amplifier having an input coupled to the string, a first demodulator phase referenced from said last mentioned pickoff plates and having an input from said sensing amplifier, a second demodulator phase referenced from said source of alternating potential and having an input from said first demodulator, the output of said second demodulator providing an indication of the relation between the support of the plane of vibration of the string, an output of said second demodulator being connected with the second signal terminal, gearing on said magnetic structure shell, an adjusting gear on the case engaging the gearing on the shell for adjustment of the magnetic assembly about the string axis, a clamp releasably locking the shell and case, a number of vibratory elements fixed to the support and extending substantially parallel to the string, said elements being resonant at the frequency of vibration of the string, a base, and a number of shock mounts connecting said case to the base.

References Cited in the file of this patent

UNITED STATES PATENTS

| | | |
|---|---|---|
| 1,995,305 | Hayes | Mar. 26, 1935 |
| 2,309,853 | Lyman | Feb. 2, 1943 |
| 2,455,939 | Meredith | Dec. 14, 1948 |
| 2,466,018 | Ferrill | Apr. 5, 1949 |
| 2,542,018 | Ferrill | Feb. 20, 1951 |
| 2,546,158 | Johnson | Mar. 27, 1951 |
| 2,974,530 | Jaouen | Mar. 14, 1961 |